United States Patent [19]

Tovi

[11] 4,225,881

[45] Sep. 30, 1980

[54] DISCRETE SURVEILLANCE SYSTEM AND METHOD FOR MAKING A COMPONENT THEREOF

[75] Inventor: Murray Tovi, Roslyn, N.Y.

[73] Assignee: Murray Tovi Designs, Inc., Long Island, N.Y.

[21] Appl. No.: 963,742

[22] Filed: Nov. 27, 1978

Related U.S. Application Data

[63] Continuation-in-part of Ser. No. 761,986, Jan. 24, 1977, abandoned.

[51] Int. Cl.[2] .......................... H04N 7/18; H04N 5/30; G03G 5/04

[52] U.S. Cl. .......................... 358/108; 358/210; 358/229; 427/51; 352/242

[58] Field of Search .................. 427/50, 51, 106, 107, 427/376 A, 376 C, 405; 417/231, 232; 358/108, 210, 229; 428/404; 352/242, 243

[56] References Cited

U.S. PATENT DOCUMENTS

| | | | |
|---|---|---|---|
| 2,545,996 | 3/1951 | Pipkim | 427/231 |
| 2,660,540 | 11/1953 | Karash et al. | 427/50 |
| 2,819,932 | 1/1958 | Westerveld | 427/50 |
| 3,220,147 | 3/1973 | Bemis | 352/242 |
| 3,531,318 | 9/1970 | Booth et al. | 427/231 |
| 3,666,547 | 5/1972 | Murphy | 427/50 X |
| 3,732,368 | 5/1973 | Mahlab | 358/108 |
| 3,739,703 | 6/1973 | Behles | 358/108 |
| 3,819,856 | 6/1974 | Pearl et al. | 358/108 |
| 3,916,097 | 10/1975 | Imai | 358/108 |
| 3,935,380 | 1/1976 | Coutta | 358/108 |

*Primary Examiner*—Robert L. Griffin
*Assistant Examiner*—Edward L. Coles
*Attorney, Agent, or Firm*—Fleit & Jacobson

[57] ABSTRACT

A surveillance system for use in apartment buildings, department stores, and the like, wherein one or more fixed scanning, pan, tilt, zoom, and/or programmed cameras are housed within a solid reflective member or globe. The globe is internally coated with a transparent nichrome layer that bonds a layer of highly reflective metal, such as silver, to the globe. A layer of SiO is, in turn, deposited on the silver layer to protect the silver layer and to control the spectral response of the globe. The SiO layer is protected by a plastic coating. Either the plastic coating or the SiO layer is coated with a material, such as black paint, to absorb reflections within the globe. A camera having a lens and a masking disc is positioned within the globe. A portion of the interior, not coated with black paint, defines a window for the lens. Also, disclosed is a process for uniformally metalizing the interior surface of the spherical globe. The process includes rotating the globe within a vacuum chamber while the nichrome, silver, and SiO layers are sequentially deposited on the interior of the globe by vaporization of material positioned on three heating filaments positioned inside the globe. Subsequent to the deposition of the layers by vaporization, the vacuum is released and the plastic and paint coatings are applied to the interior of the globe. Several times during the process, the globe is heated in an oven to vaporize solvents and expedite the process.

14 Claims, 15 Drawing Figures

FIG. 4a
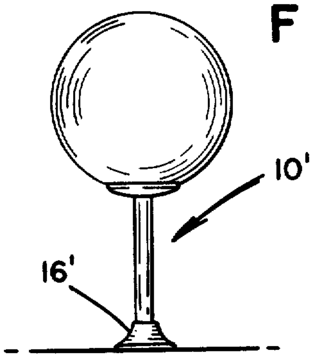
FIG. 4b
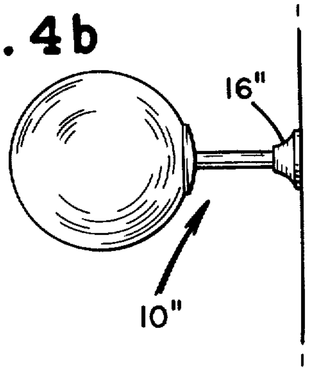
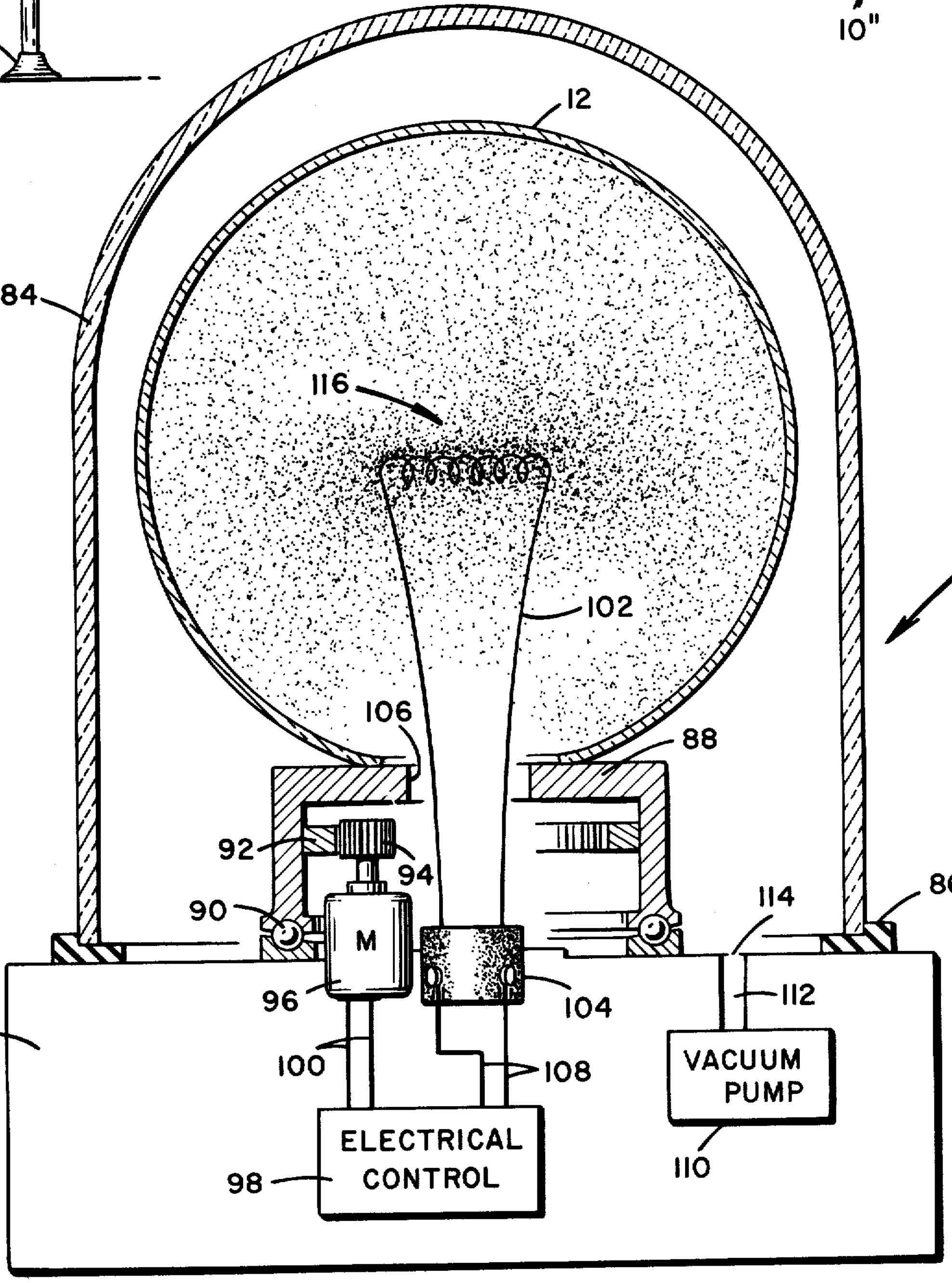
FIG. 5

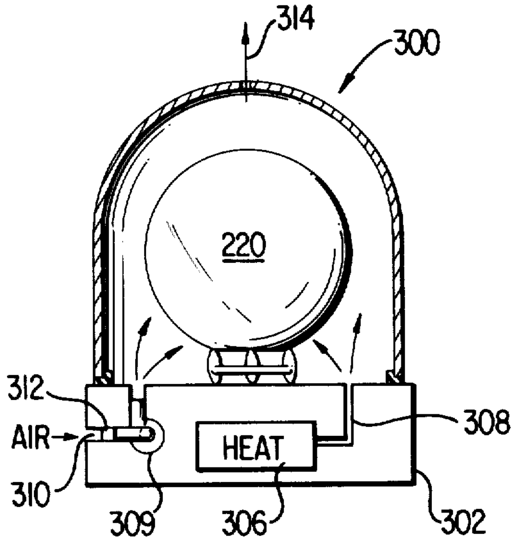
FIG. 12
FIG. 13
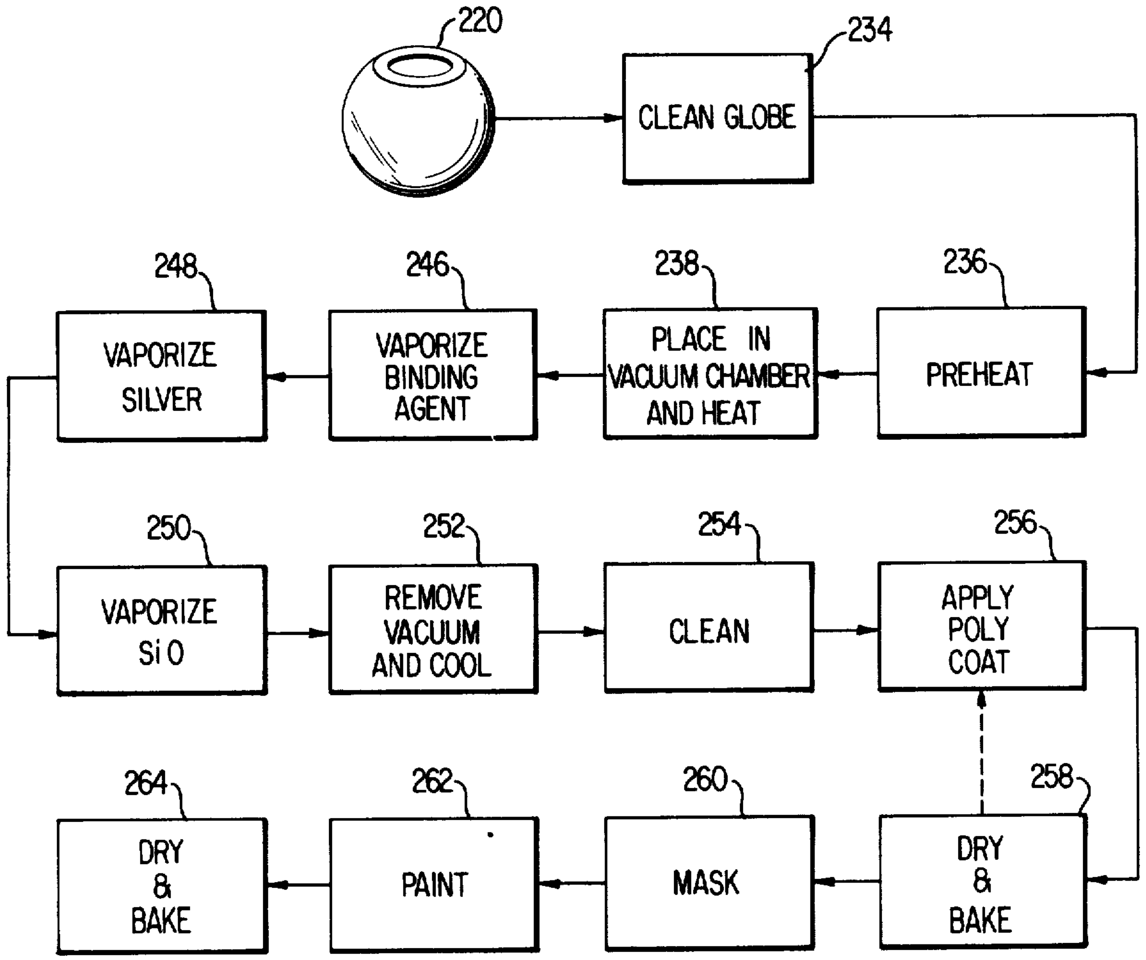

DISCRETE SURVEILLANCE SYSTEM AND METHOD FOR MAKING A COMPONENT THEREOF

CROSS-REFERENCE TO RELATED APPLICATION

This is a continuation-in-part of application Ser. No. 761,986, filed Jan. 24, 1977, now abandoned, entitled "DISCREET SURVEILLANCE SYSTEM."

BACKGROUND OF THE INVENTION

1. Field of the Invention

The present invention relates to a surveillance system for use in areas where surveillance must be accomplished with ultimate discreetness, and to a method of manufacturing a coated globe or spherical dome used in the surveillance system. The inventive surveillance system is well suited for use in apartment buildings, warehouses, department stores, production lines, convention halls, embassies, cold environments, chemically dangerous environments, and the like.

Many types of surveillance systems are known. In U.S. Pat. No. 3,935,380, there is disclosed a semi-cylindrical ceiling-mounted surveillance system for a supermarket and the like. Hemispherical ceiling-mounted systems can be seen in U.S. Pat. Nos. 3,739,703 and 3,819,856; and generally, spherical surveillance systems are also known. See, for example, U.S. Pat. Nos. 3,720,147, 3,732,368 and 3,916,097.

While each of these known surveillance systems offers some surveillance capabilities with a certain amount of discreetness, there are still many disadvantages in the art left to be overcome. For example, in most of the known surveillance systems, the presence of a camera can be relatively easily detected. Alternatively, if the camera is sufficiently masked, not enough light is transmitted to the camera through various shields used to mask the camera thereby creating problems maximizing image input to the camera.

The prior art has directed itself to overcoming the problems noted above. To prevent back light from highlighting the interior surveillance camera, separate and complex masking elements have been provided. To further camouflage the camera, the prior art has gone to decorative designs and the like to direct the attention of the viewer away from the camera. Yet, in some prior art devices, in order to improve the photographic image, the lens of the camera is exposed through a small opening or a scanning slit, which is not even masked.

Accordingly, many problems still exist in the art of discreet surveillance systems which are yet to be overcome. The present invention is directed to a surveillance system and a method of making a coated globe used with the system, which system and method minimize or entirely overcome most of the known problems.

SUMMARY OF THE INVENTION

The present invention relates to a surveillance system which attains a degree of discreetness never before attained, and which, at the same time, allows sufficient image reception by the camera to enable the use of an ordinary (rather than a low light) camera. In particular, a scanning camera is mounted in a reflective globe having its interior surface coated with several superimposed layers. A metal, such as silver, is coated on the globe and then protected with a layer of SiO. The globe is then internally blackened, except for a window for the camera, and the camera lens is equipped with a masking disc. The globe is preferably formed of unseamed clear glass free from chill lines.

Silver, when coated with SiO, is very highly reflective, with good transmission in a zone where the camera is most sensitive. Hence, the impression of virtually total reflection from outside the globe can be attained by a relatively thin reflective coating. Accordingly, the internal camera can be entirely masked from the view of one standing away from the globe, and yet sufficient light can still pass through the metal coating to enable a clear image to be received by an ordinary camera. The spherical globe can also serve as an on-site visual surveillance mirror with a wide field of view. Also, the globe can be hermetically sealed to provide a barrier which allows use of the system in cold environments or chemically difficult ones.

The advantages brought about by internally coating a glass globe with a layer of metal, such as silver, and a layer of SiO, are not accomplished without accompanying difficulties. The high degree of light transmission and the high degree of reflectivity result in a substantial amount of deleterious internal reflections within the globe.

These reflections are minimized by coating or painting the interior of the globe, except for a window for the camera lens, with a highly light absorbent substance, such as black paint. Also, a baffle system is positioned inside the globe to prevent light transmission through vent holes formed in the globe. Since the index of refraction between SiO and air differs from the index of refraction between SiO and the paint, the SiO layer is coated with a clear plastic film, such as polyurethane, either before or after the paint is applied. This coating further reduces the problem of internal reflections and enhances the external appearance of the globe or sphere. The coating serves the further function of preventing the metal coating from chipping or otherwise deteriorating.

In addition to the above, the camera lens is provided with a relatively large blackened disc which ensures that any light near but missing the camera's lens will be immediately absorbed. The rear surface of the disc also adds to the absorption of light reflected from the back of the camera and housing.

The camera is further mounted off center in the sphere so reflections bouncing off the lens (not being absorbed) are not reflected back into the lens.

One significant advantage of the present invention is that bright images can be obtained in average rooms without the need for a sophisticated and extremely expensive low-light camera. This is important because a conventional camera can cost one third as much as a low-light camera. The uniformity of the reflective coating is, accordingly, extremely important. Also, when low-light cameras are used with the present invention, their sensitivity is greatly improved.

The present invention also relates to a method for metalizing the interior of the spherical globe. A conventional metalizing technique is to place the body to be metalized in a vacuum chamber, and to evaporate the metalizing material from the heated end of an electric filament. The shape of the filament and relative temperatures along the length of the filament generally affect the uniformity of the coating, with certain areas of the coating becoming thicker than others.

With the present invention, the globe is positioned in a vacuum chamber, over the filament, and during evaporization of the metalizing material, the globe is rotated. The globe is preferably rotated through one complete revolution, but can be rotated through any member of revolutions or half-revolutions. In this manner, the uniformity of coating of the interior surface of the globe is greatly enhanced. It has been found that a high degree of uniformity of coating can be accomplished through only one revolution of the globe during the evaporization process.

With a preferred embodiment of the method of the present invention, the globe is positioned in a vacuum chamber over three, preferably tungsten, filaments. The first filament is heated to melt and evaporate or vaporize a smallwire of Ni, Cr, or NiCr. The second filament, when heated, melts and vaporizes a coating material, such as silver. The third filament, when heated, melts and vaporizes a coating material, such as SiO. The first material prevents contact between the silver layer and the internal surfaces of the globe and improves deposition of the silver layer on the globe. The amount of SiO deposited on top of the silver determines the external color and the spectral sensitivity of the coated globe, while protecting the silver layer from the ambient environment. Preferably, the globe is rotated during vaporization of each of the materials. Also, a coating of plastics material and a coating of masking material are applied over the SiO layer.

It is, accordingly, a principal object of the present invention to provide a discreet surveillance system which is attractive, and which accomplishes maximum discreetness with minimum cost.

A further object of the present invention is to provide a discreet surveillance system wherein a fixed, scanning, pan/tilt, programmed, and/or multi-tube camera is mounted within a reflective globe, and wherein the globe can be combined with other "blank" globes as objects of decoration.

A more specific object of the present invention is to provide a discreet surveillance system wherein a glass globe is internally metalized with layers of silver and SiO and wherein the SiO layer is coated with a plastic film.

Another object of the present invention is to provide a surveillance system wherein a scanning camera is mounted within a metalized globe, the interior of the globe being blackened, except for a window for the camera lens.

Still, a further object of the present invention is to provide a reflective-globe discreet surveillance system which also functions as an on-site surveillance mirror.

Still, another object of the present invention is to provide a discreet surveillance system including a metalized globe wherein external reflections are maximized so as to ensure discreetness, while sufficient light passes through the metalized globe to enable the use of a relatively inexpensive camera, or a low-light camera in relatively dark areas.

A further object is to provide a surveillance system that can be used in low temperature and adverse chemical environments.

These and other objects of the present invention, as well as many attendant advantages thereof, will become more readily apparent when reference is made to the following description, taken in conjunction with the accompanying drawings.

BRIEF DESCRIPTION OF THE DRAWINGS

FIG. 1(*b*) is a perspective view of the globe illustrated in FIG. 1(*a*), illustrating how the inventive globe can serve as an on-site surveillance mirror;

FIG. 4(*a*) shows the inventive surveillance device as a floor-mounted mechanism;

FIG. 4(*b*) shows the inventive device on a wall;

FIG. 5 is a partial cross-section illustrating one embodiment of an apparatus for obtaining uniform internal metalizing;

FIG. 12 is a cross-sectional view of an apparatus used with the apparatus of FIG. 10 to obtain coated globes; and FIG. 13 is a schematic diagram of the method used to obtain the embodiment of FIG. 6.

DETAILED DESCRIPTION OF THE DRAWINGS

Since surveillance systems are well known, the present description will be directed, in particular, to elements forming part of, or cooperating more directly, with the present invention. Elements not specifically shown or described herein are understood to be selectable from those known in the art.

Figure 1A:
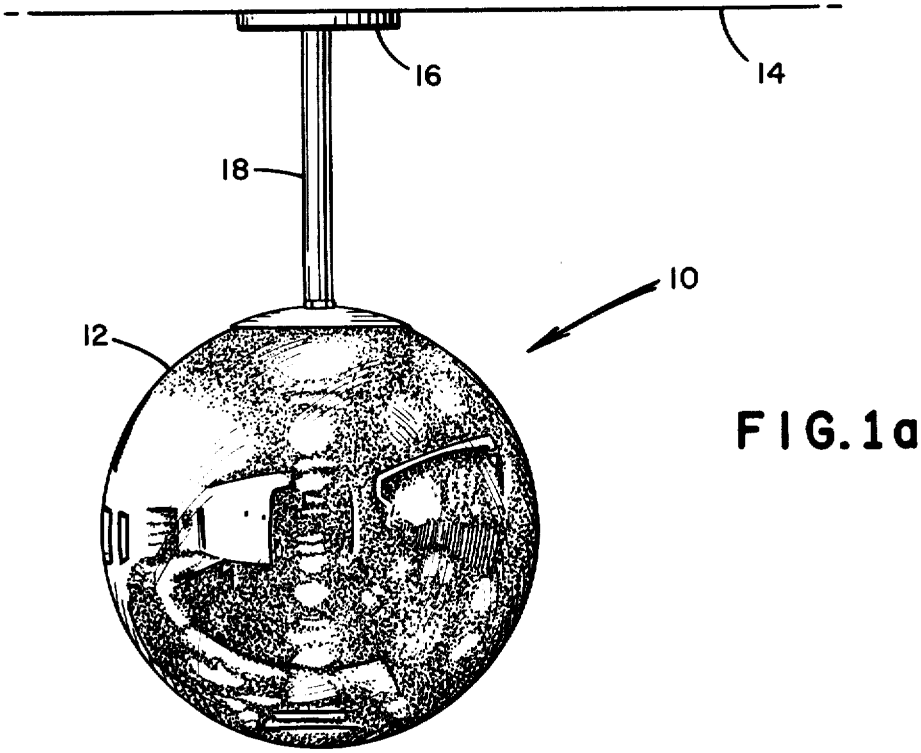
FIG. 1(*a*) is a front view of the inventive surveillance system showing the appearance of a metalized globe hung from the ceiling.
Figure 1B:
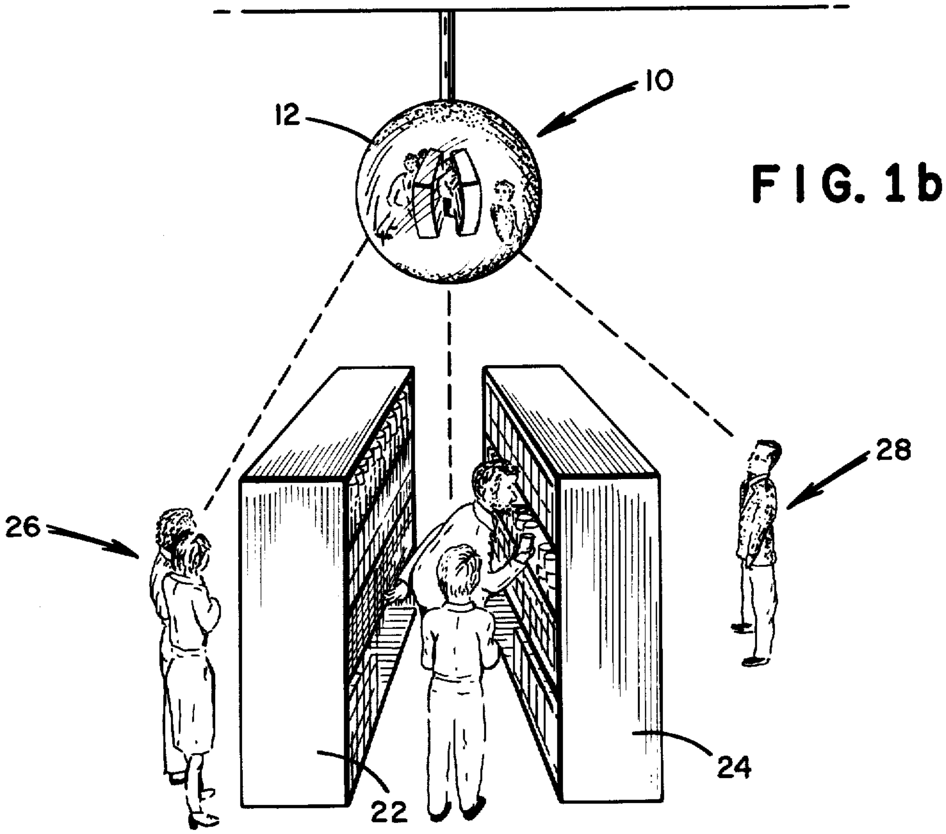

With reference first to FIG. 1(*a*), the inventive surveillance device can be seen at 10. The device 10 comprises a glass sphere or dome 12 mounted on a ceiling 14 by means of a bracket 16. Globe 12 is connected to bracket 16 through the means of a hollow tube 18 associated with a mount 20, as best seen in FIG. 2.

The inventive surveillance device 10 is most attractive and can well serve with other "blank" globes 12 as decorative hanging fixtures. At the same time, as illustrated in FIG. 1(*b*), globe 12 serves as a reflective mirror giving a wide range of view.

For example, if used in a department store having adjacent shelving units 22 and 24, as shown in FIG. 1(*b*), the field of reflective view would include persons shown at 26 as well as the individual shown at 28. As such, the inventive surveillance device 10 could replace standard, limited range surveillance mirrors.

Figures 2, 3:
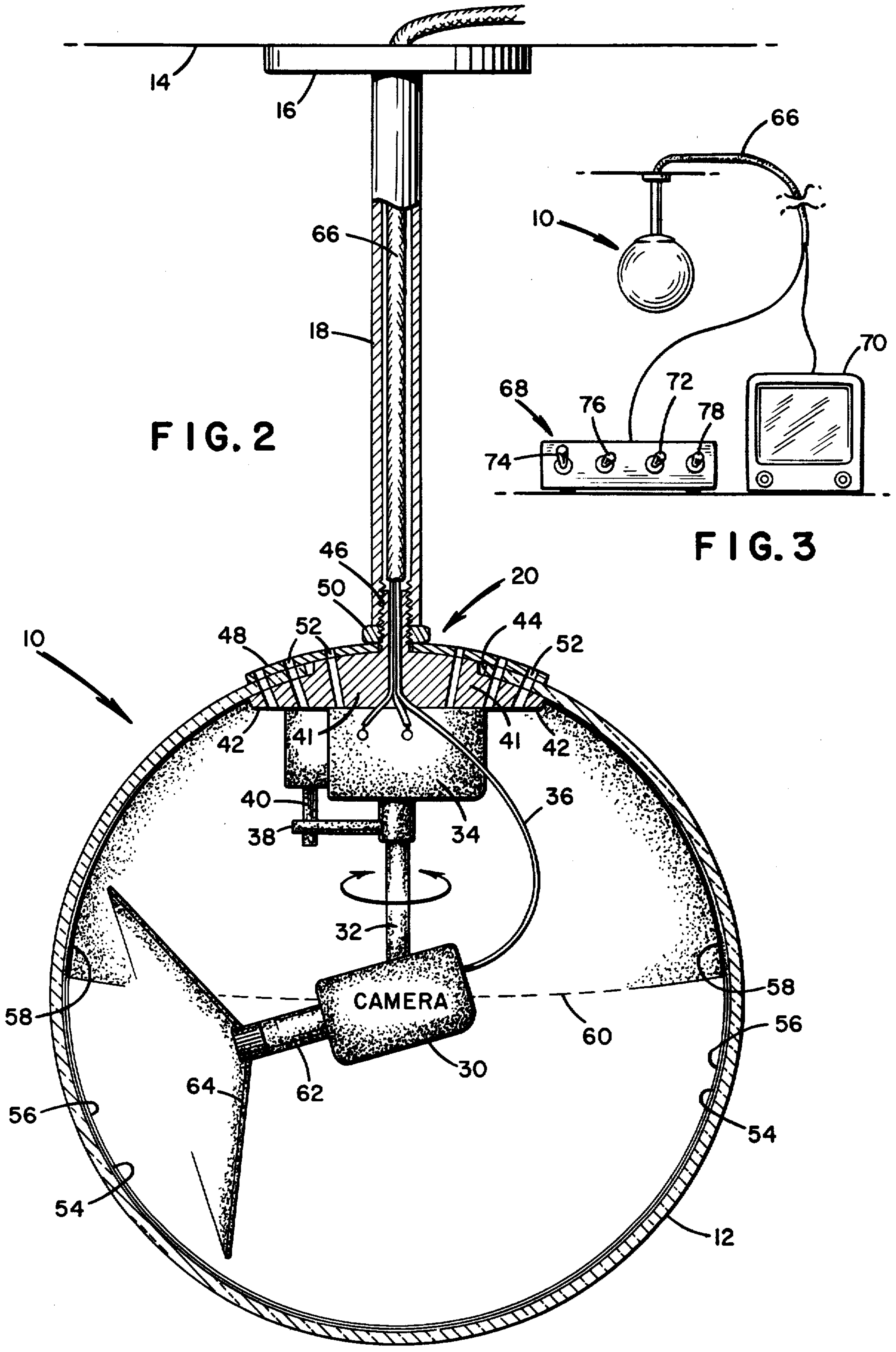
FIG. 2 is a partial cross-section showing the internal construction of one embodiment of the inventive surveillance system.
FIG. 3 is a simplified schematic drawing illustrating auxiliary equipment useful with the inventive surveillance system.

With reference now to FIG. 2, the specific details of one embodiment of the inventive surveillance system will be described. As can be seen, a camera 30 is mounted within the confines of globe 12. Camera 30 is mounted on the shaft 32 of a reversible motor 34 and sends its electrical output representative of the photographed image through cable 36. A pin 38 is mounted for rotation with the shaft 32, and associates with one or more limit switches, an arm of which is shown at 40.

The camera 30 and its surrounding globe 12 are connected to hollow tube 18 through the means of the mounting member 20. Mounting member 20 includes an interior support 41 having a continuous flange 42 of spherical outline, extending more outwardly than the diameter of an opening 44 through the top of globe 12. The upper surface of support 41 is narrow and is threaded, as shown at 46, and extends outside the region of globe 12. A cap 48 of generally spherical outline, and of a size generally corresponding to the diameter of flange 42 on support 41 is positioned on the exterior surface of globe 12, extending over threaded shaft 46. A nut 50 is then threaded onto extension 46, and locks together the assembly of support 41, cap 48 and globe 12. Tube 18 is preferably integral with support 41. Support 41 is provided with a plurality of ventilation ports 52 which extend into the interior of globe 12 to permit heat escape from the globe.

The interior surface of globe 12 is covered with a thin coating 54 of silver. This metal film is itself covered with a thin layer of SiO, then a thin layer of transparent plastic, such as polyurethane film 56. A coating of matte or glossy black paint 58 is provided on the interior of the sphere or globe 12. Boundary 60 indicates the extent of the darkened layer 58.

The camera 30 is provided with a lens 62, which may be a fixed lens, or which may be of the motorized zoom-type. Furthermore, the lens aperture may be automatically set, may be remotely controlled, or both. And, preferably, a masking disc 64 is associated with lens 62. Disc 64 is of a matte or glossy black finish, as is lens 62 and camera 30 and, if necessary, the exterior of all motor and mounting surfaces.

A multi-strand electrical cable 66 extends from the interior of globe 12 through tube 18 to remote equipment such as that shown in FIG. 3. This external equipment can take the form of, for example, a control panel 68 and a monitor 70. In this regard, control panel 68 might have a control such as that shown at 72 for switching between automatic and manual scanning, a left-scan toggle 74, a right-scan toggle 76, and a zoom toggle 78. Other controls, such as aperture setting, can, of course, be incorporated as control panel 68.

In FIGS. 1 and 2, the inventive surveillance device 10 is shown to be ceiling-mounted. Because of the high degree of reflectivity brought about with the inventive globe 12, the camera 30 is masked from sight, even when a potential observer is in close proximity to the globe. It is, accordingly, possible with the inventive device, to mount the surveillance system on the floor or on a wall. The floor-mounted version of the inventive system is illustrated at 10′ in FIG. 4(*a*). A wall-mounted version can be seen at 10″ in FIG. 4(*b*). With both of these embodiments, a plurality of openings 52′ provide for passage of heated air out of the interior of the globe. Alternatively, or in addition, the floor-mounted unit contains one or more vent openings 52″ in its top.

Figure 9:
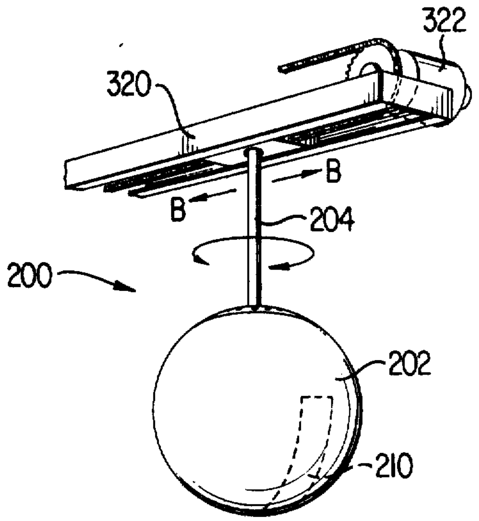
FIG. 9 illustrates the inventive surveillance device mounted for traverse and for rotation.

If the globe is to be used in a low-temperature or adverse chemical environment, the openings can be omitted or sealed to protect the camera. With low-temperature environments, the heat generated by the system components that is retained within the globe is sufficient to protect the components. And, with the exception of the respective brackets 16′ and 16″ shown in FIGS. 4(*a*) and 4(*b*), the surveillance system of FIG. 4 is identical with that illustrated in FIG. 2. Also, as illustrated in FIG. 9, the surveillance system of the present invention can be mounted on a ceiling or other suitable surface for transverse movement. Thus, one system can scan large areas.

The operation of the inventive surveillance system is as follows. A guard sits at the control panel 68, and views monitor 70. If in "autoscan" mode, the camera 30 scans on the order of 360°, if desired, until pin 38 comes in contact with arm 40 from the internal limit switch. The limit switch then reverses the operation of motor 34, and camera 30 begins scanning in the opposite direction. If the guard sees any unusual activity, he has the option of turning off the autoscan by operating toggle switch 72 and can then adjust the camera through the means of left and right controls 74 and 76, respectively. Toggle switch 78 can also be manipulated to control the zoom aspect of lens 62. Also, programmed, multi-video tubes can be used with the surveillance system. Further, intermediate limit switches can be positioned to stop the camera scan at predetermined points.

With reference now to FIG. 5, one embodiment of an inventive apparatus and method for metalizing the interior of the reflective globe 12 will be described. The metalizing device is illustrated at 80 in FIG. 5, and comprises a base 82 and a transparent dome 84. Dome 84 is generally circular in cross-section, and is in airtight communication with base 82 through the means of an annular seal 86.

Globe 12 sits on a rotating shelf 88 mounted on base 82 through bearings 90. Th interior surface of shelf 88 is equipped with a ring gear 92 which cooperates with a gear 94 on the shaft of a motor 96. The operation of motor 96 is controlled by an electrical control 98 connected to the motor through conductors 100.

A heating element 102 is mounted on a ceramic base 104 integral with base 82. As can be seen in FIG. 5, filament 102 extends through an opening 106 in shelf 88, and resides in the interior of globe 12 when the globe rests on shelf 88. Conductors 108 bring electrical energy to filament 102 from the electrical control 98.

A vacuum pump 110 is also provided in base 82, and communicates with the interior of dome 84 through the means of line 112 and port 114.

In operation, a length of metalizing material, such as very pure silver or aluminum, is cut from a wire or rod and laid in communication with the tip 116 of filament 102. Electrical control 98 is then energized, and filament 102 is heated until the metalizing material wets the hot tip 116 of the filament. With further heating of the filament 102, the metalizing material begins to boil and evaporate, condensing on the interior of the globe 12. Preliminary to heating of filament 102, a vacuum is drawn by energizing vacuum pump 110, and, hence, evacuating the entire area beneath dome 84, which is sealed to base 82 through the means of annular seal 86. During the evaporation operation, motor 96 is energized by electrical control 98, and the shelf 88, with the associated globe 12, is rotated. The speed of motor 96 is regulated so that the desired amount of reflective agent coats the interior of globe 12. It is possible to completely coat the dome in one-half of one revolution, or any other integral number of half-revolutions.

Figure 6:
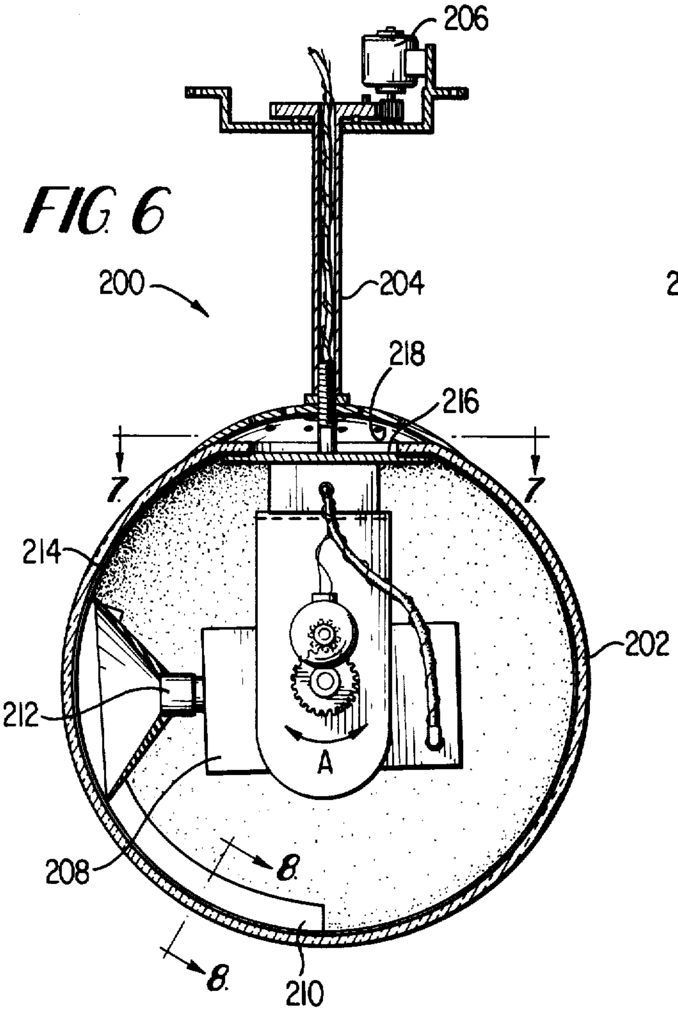
FIG. 6 is a view similar to FIG. 2 illustrating another embodiment of the present invention.

Referring now to FIG. 6, another embodiment of the surveillance system of the present invention is illustrated.

This embodiment, which is generally designated 200, utilizes a globe or spherical dome 202 connected to a shaft 204 that is rotated by a motor 206. A camera 208 is positioned within the globe 202 in such manner that the camera is able to reciprocate in the direction of the double-headed arrow A. Unlike the embodiment illustrated in FIG. 2, the camera used with the embodiment of FIG. 6 is unable to rotate with respect to the globe 202. With this embodiment, both the globe 202 and camera 208 rotate as one unit.

Since the camera and globe rotate together, only a small slit or slot 210 is required for the lens 212 of the camera. Thus, significantly fewer problems with internal reflection are encountered with the use of this embodiment. Such internal reflections are minimized by the use of a masking disc 214 surrounding lens 212 and a blocking plate 216 preventing or blocking light from entering the interior of globe 202 through the vents or air passages 218. As can be seen from FIG. 6, the interior of shaft 204 serves as a conduit for cables controlling the operation and tilting of camera 208.

Figure 7:
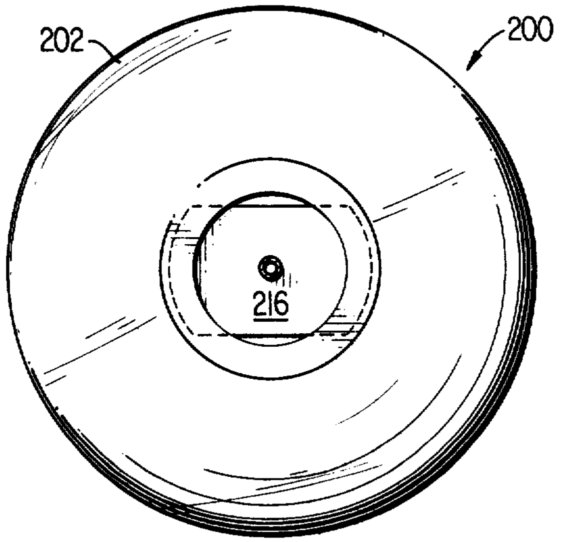
FIG. 7 is a view taken along line 7—7 of FIG. 6.

As can be seen from FIG. 7, the plate 216 has a reduced diameter portion to allow insertion of the plate into the interior of globe 202. Also, plate 216 serves as a mounting plate for camera 208.

Figure 8:
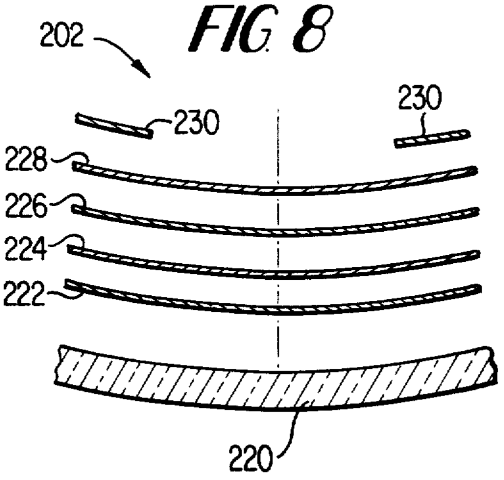
FIG. 8 is an exploded view taken along line 8—8 of FIG. 6.

As can be seen from FIG. 8, the embodiment illustrated in FIG. 6 utilizes a globe 202 formed of a sphere 220, which is preferably made of blemish-free glass, having a plurality of layers, coatings or films 222, 224, 226, 228, 230 and 232 coated or deposited thereon. Layer 224 is formed of pure silver or similar reflective material and is a few angstroms thick. Layer 222, which is, preferably, formed of Ni, Cr, or NiCr, acts as a bonding layer to improve the adhesion of layer 224 to sphere 220. Layer 226 is formed of SiO and is provided to protect silver layer 224 and to control the transmission sensitivity range of the coated sphere 220. Since the index of refraction of the SiO layer is influenced by air contact with the layer, layer 226 is coated with one or more polyurethane layers 228 and 230. Finally, layer 232 is a coating of paint or similar material that defines the slot 210.

Referring now to FIG. 13, a method of producing the coated globe 202 will be described.

The method starts with the selection of an appropriate blemish-free sphere 220 or other shaped member that is preferably free of chill lines. Next, the selected globe or member is cleaned, as schematically illustrated by block 234, to remove impurities. The cleaning includes a rinsing with deionized water because Si is susceptible to chemicals and, preferably, a rinsing with distilled acetone. Next, as schematically illustrated by block 236, the cleaned globe is baked in an oven to dry out the globe. One embodiment of the method heats the globe in an oven at a temperature of approximately 550° F. for approximately five minutes. By pre-heating the globe, the time required in the next step, which is schematically illustrated by 238, to obtain a desired vacuum, for instance $3\times10^{-5}$ Torr, is significantly reduced. As will be discussed in more detail later, three tungsten filaments are positioned inside the globe within the vacuum chamber.

The first tungsten filament, as schematically illustrated by block 246, is heated to initially melt and then vaporize a binding agent, such as NiCr, to form a thin transparent coating on the inside of the sphere. For instance, a wire having a diameter of approximately 0.005 inches and a length of approximately 0.5 inches is placed inside the coils of the filament to provide the required amount of material to coat a 16-inch diameter sphere. Next, as schematically illustrated by block 248, the second filament is heated to slowly melt and evaporate a piece of silver wire having a diameter of approximately 0.020 inches and a length between 0.75 and 2.50 inches. The silver is evaporated slowly, for instance during a period of approximately one minute, to ensure even deposition of the silver on the previously coated layer. Finally, as schematically illustrated by block 250, the third filament is heated to melt and vaporize SiO. Normally, the SiO is provided in rock form in an amount greater than that needed for the coating.

Before the silver is coated with the SiO, light transmitted through the sphere appears blue to the eye. As the amount of SiO deposited on the silver layer increases, the light transmitted through the sphere shifts to green-yellow-brown. The rate at which the color shift occurs is determined by factors such as the amount of SiO positioned inside the tungsten filaments, the heat within the vacuum chamber, and the size of the globe to be coated. The vaporization of SiO is stopped as soon as the coated sphere is the desired color.

As is well known, cameras used with presently known surveillance systems have different spectral sensitivities. For instance, Panasonic Video Systems markets closed circuit television cameras especially designed for security that utilize vidicon pick-up tubes having different sensitivities. For instance, a Standard Panasonic Vidicon 20PE13A is most sensitive at a wave length less than 600 nm, while a Panasonic Silicon Vidicon 20PE15 and a Panasonic Newvicon S4075 have maximum spectral sensitivities at wave lengths greater than 600 nm. Thus, use of the SiO coating allows control of wave length transmission characteristics to match the transmission sensitivity of the globe with the spectral sensitivity of the pick-up tube used with the system.

As with the method discussed in connection with FIG. 5, the sphere 220 is preferably rotated during the vaporization of the coating materials to improve the uniformity of the coating deposited on the sphere.

After the last coating has been vaporized, the vacuum is released and the coated sphere is allowed to cool to ambient temperature, as illustrated by block 252. Next, as illustrated by block 254, a filtered solvent, such as paint thinner, is applied to the interior of the coated sphere to clean and wet the SiO layer. Then, as represented by block 256, a mixture of polyurethane and a solvent, preferably a 50—50 mixture, is applied to the inside of the sphere, for instance, by spraying. The coating protects the SiO layer and ensures uniform spectral response of the coated sphere.

After the coat has been applied, the sphere is dried and baked, as represented by block 258, to remove the solvent. Since it is important that a sufficient thickness of polyurethane be provided on the SiO coating, the application step, as represented by the dashed line between blocks 258 and 256, can be repeated.

If desired, prior to both steps 236 and 258, the interior of the sphere 220 can be dried with filtered heated air to expedite steps 236 and 258 and to minimize flammability problems associated with solvent evaporation. Heated filtered air can be provided by any suitable method, for instance, by using a paper filter over the inlet of a hair dryer.

After the coated sphere has been dried and baked to eliminate the solvent, a step which protects deterioration of the silver coating by contact with the solvent, the coated sphere is carefully examined to identify an optically good portion of the coated sphere. For instance, characteristics such as thickness of coatings, smoothness of coatings, and lack of distortion are evaluated either by eye, by use of a camera, or by any suitable measuring technique. Once a suitable area has been identified, it is masked or marked by using a grease pencil to outline the area on the outside surface of the sphere. Portions of the inside surface outside of the outlined area are then painted, as represented by block 262, preferably with an oil base, shiny or flat black paint. Finally, as represented by block 264, the globe is baked to remove the paint solvent. If necessary, more than one coat of paint can be applied.

The dimensions of the opening defined by the paint are determined by factors such as the size of the lens of the camera, the area to be observed and the size of the globe. For instance, with a 16-inch outside diameter globe, a slot 210 approximately 9 inches long and 5 inches wide has been found useful. The slot extends from just above the midline of the globe to approximately the center of the bottom.

Certain of the procedures in the aforementioned method are essential, while others are merely desirable. For instance, a plastics coat, such as polyurethane, must be applied to the SiO coat to make sure that none of the SiO coat is exposed to the air. With the plastics coat all of the coated globe appears silver. If, however, the SiO coat is painted and no plastics coat is applied, a purple tinted silver window becomes visible. The plastics coat, however, can be applied either before or after the paint step. Also, if a rainbow effect is noted after application of one plastics coat, it is an indication that the coat was not applied in sufficient thickness. The rainbow effect can then be eliminated by applying a second coat. Also, steps such as the preliminary cleaning of the globe, the preheating of the globe, and the vaporization of the binding agent are preferred, but not required.

Figure 10:
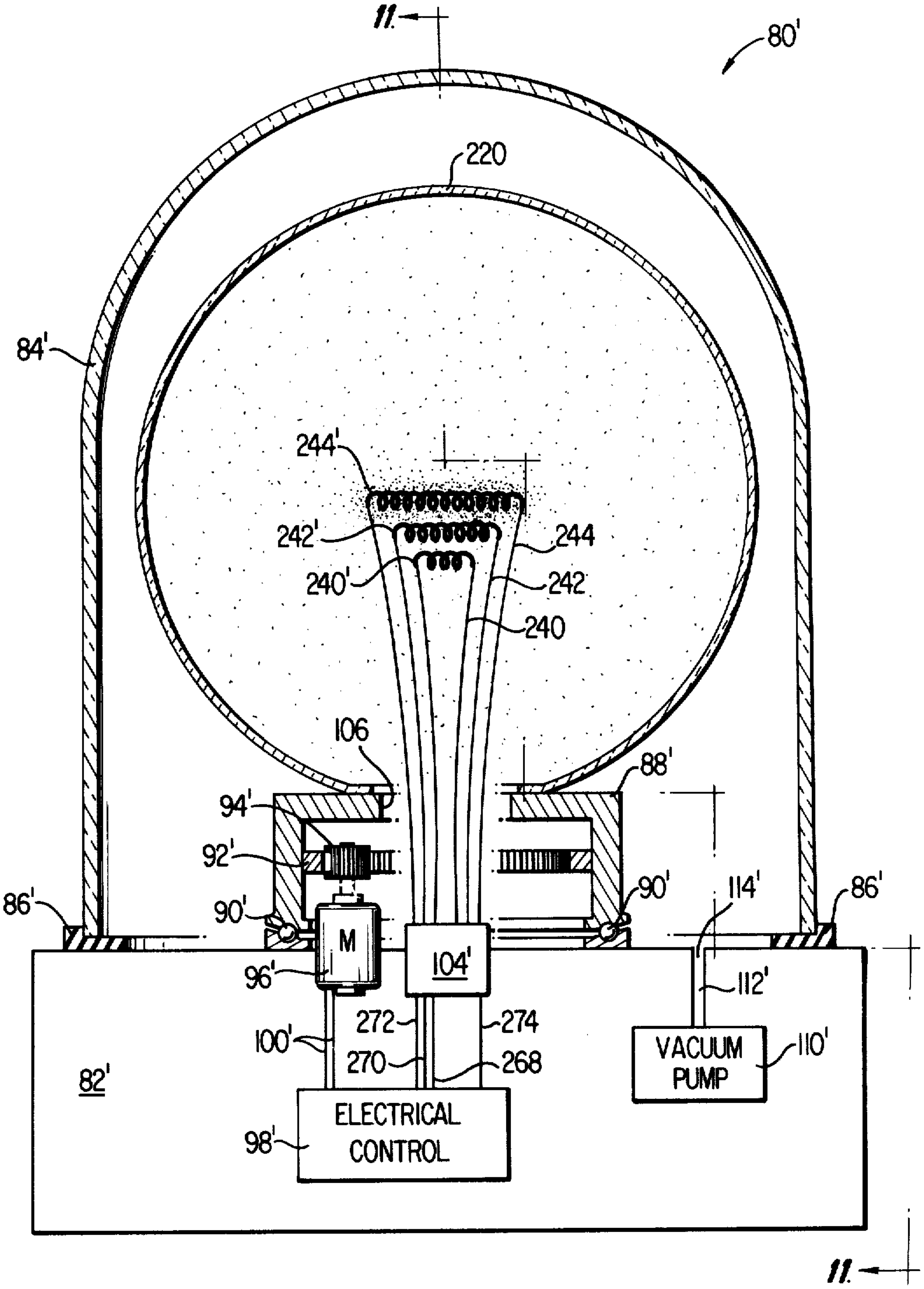
FIG. 10 is a view similar to FIG. 5 illustrating another embodiment of an apparatus for obtaining uniform internal metalizing.
Figure 11:
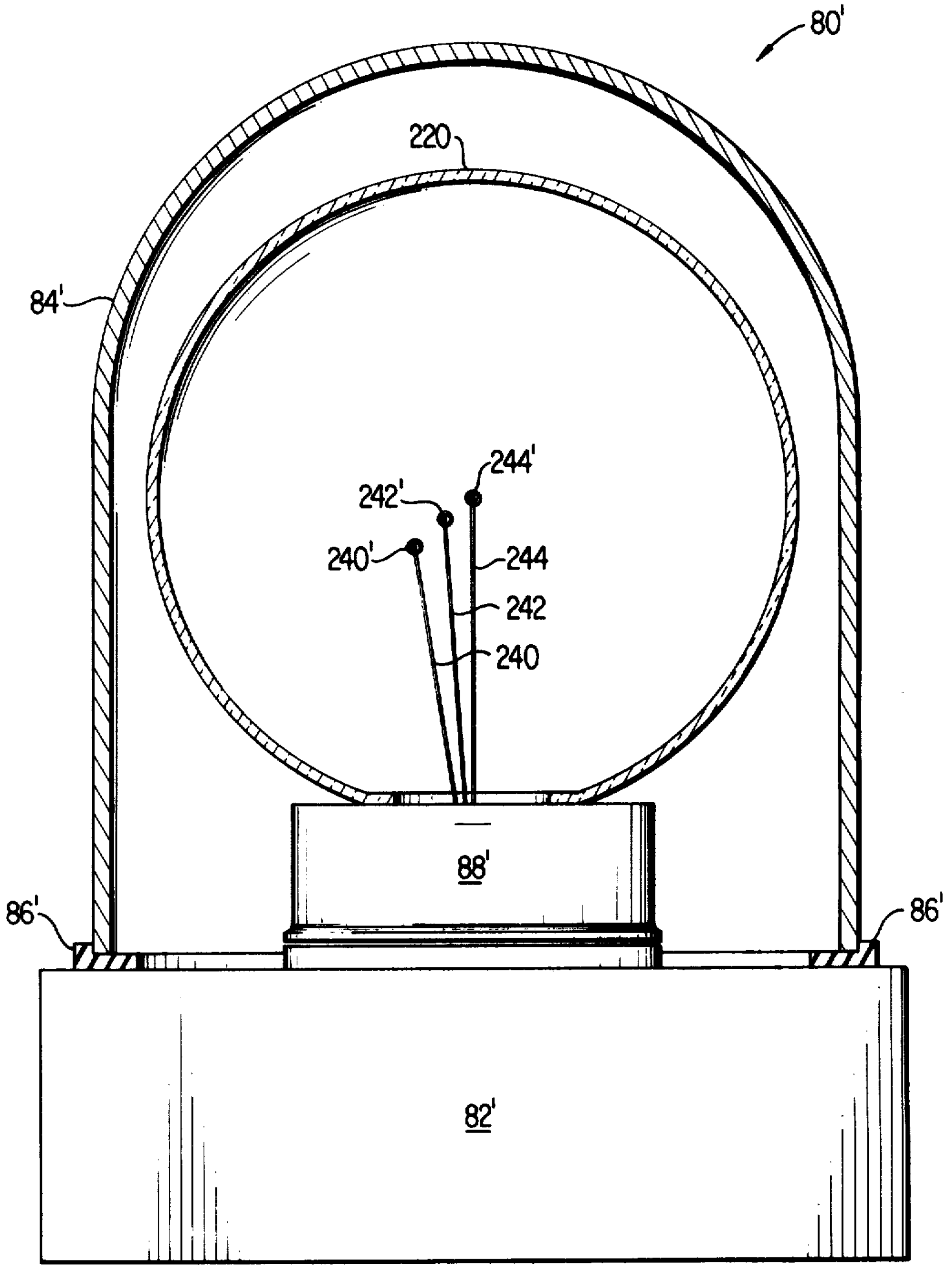
FIG. 11 is a view along line 11—11 of FIG. 10.

Referring now to FIGS. 10, 11, and 12, an apparatus for performing the method of FIG. 13 will be described.

A first component of the apparatus, as illustrated in FIG. 10, utilizes components similar to those previously discussed in connection with FIG. 5. Accordingly, the same reference numerals as those used in FIG. 5, with primes attached, have been used to identify the components of FIG. 10.

The metalizing device, which is generally designated 80', comprises a base 82' and a transparent dome 84'. Dome 84' is generally circular in cross-section and is in airtight communication with base 82', through the means of an annular seal 86'. Globe 12 or sphere 220 sits on a rotating shelf 88' mounted on base 82' through bearings 90'. The interior surface of shelf 88' is equipped with a ring gear 92' which cooperates with a gear 94' on the shaft of a motor 96'. The operation of motor 96' is controlled by an electrical control 98' connected to the motor through conductors 100'.

Heating elements or tungsten filaments 240, 242, and 244 are mounted on a ceramic base 104' integral with base 82'. Since the SiO coating is considered most important, the filament 244 is positioned in the center of globe 220, as illustrated in FIGS. 10 and 11. Filament 242 is positioned slightly off-center and lower than filament 244, while filament 240, the least critical of the filaments, is positioned lower than filament 242. As can be seen in FIG. 10, filaments 240, 242 and 244 extend through an opening 106' in shelf 88' and reside in the interior of globe 220 when the globe rests on shelf 88'. Conductors 268, 270, and 272, together with common conductor 274, connect the filaments with electrical control 98'.

A vacuum pump 110' is also provided in base 82', and communicates with the interior of dome 84' through line 112' and port 114'.

In operation, a length of suitable material, such as Cr is cut and placed in the tip 240' of conductor 240. Similarly, a piece of very pure silver is cut and laid in communication with the tip 242' of filament 242. Finally, one or more "rocks" of SiO are placed in communication with the tip 244' of filament 244. The interior of device 80' is then evacuated and, preferably, heated to pre-heat the globe 220. Globe 220 is then rotated by motor 96' while electrical control 98' sequentially energizes the filaments 240, 242, and 244 to melt and vaporize the materials associated with the filaments. The speed of motor 96' is regulated so that the materials are evenly deposited on the inside of sphere 220. It is possible to completely coat the dome in one-half of one revolution or any other integral number of half-revolutions. For instance, motor 96' can rotate globe 220 at a speed of approximately one rpm. It will be appreciated that the rate of evaporation of the materials to be coated influences the rate of rotation of sphere 220.

As previously discussed in connection with FIG. 13, the uncoated sphere 220 is preheated during step 236 and the coated sphere 220 is dried and baked during steps 258 and 264. A suitable apparatus for performing these steps is illustrated in FIG. 12. The apparatus, which is generally designated 300, has a base 302 and a dome 304 sealed to the base. After the sphere is positioned inside the dome, a heat source 306 communicates through a duct 308 with the interior of the dome 304 to heat the sphere 220. Also, air is drawn by a compressor 309 through an inlet 310 and a filter 312 into the interior of dome 304. Alternatively, the heat source 306 can furnish heated air to the interior of the dome. An opening 314 is provided to allow escape of air from the dome. The rate of air flow is sufficiently high to dilute any evaporated solvents. In lieu of the apparatus illustrated in FIG. 12, a conventional oven can be used to dry and bake the sphere 220.

Referring now to FIG. 9, a few comments will be made on the particular embodiment illustrated in this figure. As previously mentioned, FIG. 9 illustrates an embodiment of the present invention in which globe 202 is mounted for reciprocation or translation in the direction of arrows B, for instance, for a length of approximately 100 feet. For this purpose, shaft 204 and its associated motor are mounted for reciprocation in an axially-extending track 320. A motor 322 is provided to control translatory movement of the surveillance system 200. This embodiment greatly enhances the utility of the surveillance system of the present invention in that one system is able to cover a much larger area.

As previously discussed, one problem encountered with use of a previously known system is the amount of light absorbed by the coating used to hide the cameras used with the surveillance systems. For instance, one previously known system utilizes a coating of nichrome on a plastic sphere. Presented below is a chart comparing the embodiment of the present invention illustrated in FIG. 6 with a globe having a single layer of nichrome coated on a plastic sphere.

Light Absorption

-continued

| Wave Length (nm) | Present invention | NiChrome on Plastic |
|---|---|---|
| 450 | 11% | 51% |
| 500 | 14% | 41% |
| 550 | 14% | 41% |
| 600 | 19% | 41% |
| 650 | 19% | 41% |
| 700 | 18% | 40% |

| | Transmission | |
|---|---|---|
| Wave Length (nm) | Present invention | NiChrome on Plastic |
| 450 | 42% | 13% |
| 500 | 41% | 14% |
| 550 | 40% | 15% |
| 600 | 37% | 16% |
| 650 | 36% | 18% |
| 700 | 36% | 20% |

The above values for the present invention are averages of measured values. The actual measured values tended to vary approximately in the shape of a sine curve. This variation probably occurs because of difficulties encountered in measuring absorption and transmission through a multi-layered spherical object. Also, it is believed that the absorption values for the device of the present invention would be lower than those indicated. Visual comparison of the exterior surfaces of the two globes tended to indicate that the globe of the present invention was more reflective than the previously known coated plastic globe.

As previously discussed, the spectral sensitivity of the coated globe of the present invention can be varied by changing the thickness of the SiO layer deposited on the silver layer. Thus, the globe of the present invention can be used with infra-red cameras, color television cameras, and cameras using conventional photographic film. Also, if desired, stops or "pause" can be associated with the motor 206 illustrated in FIG. 6 to allow positioning of the camera in predetermined locations. Further, it will be appreciated that other shapes besides the illustrated spherical shapes can be used with the present invention. Also, a half globe or other similar structures having open tops can be used.

Previously, specific embodiments of the present invention have been described. It should be appreciated, however, that these embodiments were described for purposes of illustration only, without any intention of limiting the scope of the present invention. Rather, it is the intention that the present invention be limited not by the above but only as is defined in the appended claims.

What is claimed is:

1. A surveillance device comprising, in combination:

a spherical dome having an opening communicating with the interior of said dome;

a reflective metalizing coating of silver positioned on the interior surface of said dome;

a coating of SiO positioned on said silver coating;

a plastic film covering said SiO coating on the interior of said dome;

mounting means associating with said opening for supporting said dome;

a camera connected to said mounting means and having a lens positioned in the interior of said dome;

scanning means for turning said camera about a predetermined scan angle;

means for mounting said dome on a surface; and a matte darkened coating positioned on portions of said dome defining an opening in said dome for said lens.

2. The device recited in claim 1, and further comprising a control panel for controlling the operation of said camera.

3. The device recited in claim 2, wherein said control panel includes means for controlling the scan of said camera, and wherein the camera lens has zoom and aperture opening features controlled by said control panel.

4. The device recited in claim 1, and further comprising a masking disc positioned on the lens of said camera for rotation therewith.

5. The device of claim 1, wherein said dome is comprised of glass.

6. The device of claim 1, wherein said scanning means includes a limit switch for limiting rotation of said camera.

7. A surveillance device comprising:

a camera having a lens;

a rotatable housing containing said camera;

means for rotatably connecting said housing to a support surface; and means for rotating said housing, said housing being adapted to conceal said camera therein in such manner that said camera can function without being seen by an observer, said housing comprising:

a transparent outer surface defining a container;

a reflective silver coating positioned on the interior surface of said container;

a coating of SiO positioned on the silver coating;

a coating of plastics material; and a coating of masking material, one of said plastics material and said masking material coatings being positioned on said SiO coating and the other of said coatings being positioned on said one coating, said masking material covering portions of the interior of said container thereby absorbing reflections within said container, portions of the interior not covered by said masking material defining an aperture through which said camera lens receives illumination.

8. A device according to claim 7 wherein said housing comprises a spherical dome having an opening formed therein for receiving said connecting means, and wherein said reflective silver coating, said SiO coating, and said plastics material coating are superimposed and cover all interior surfaces of said housing.

9. A device according to claim 7 wherein the spectral sensitivity of said housing is variable, the sensitivity being a function of the thickness of the SiO coating.

10. A spherical dome for use with a surveillance system, the dome being adapted to conceal a camera therein and having a portion thereof modified to define a viewing slit for the lens of the camera, the viewing slit substantially blending with other portions of the dome when viewed from an exterior position during operation of the surveillance system, said dome comprising:

a spherical member having a first outwardly facing surface defining an exterior surface of said dome and a second inwardly facing surface;

a reflective metallizing coating of silver positioned on said inwardly facing surface;

a coating of SiO positioned on said silver coating;

a first coating comprised of plastics material; and a second coating comprised of masking material, one of said first and said second coatings being positioned on said SiO coating, the other of said first and said second coatings being positioned on said one coating, said masking material coating being positioned in such manner that the viewing slit is defined by portions of the dome not covered by the masking coating.

11. A dome according to claim 10 wherein a coating of binding material is positioned between the second surface of said spherical member and said silver coating, said binding material improving the positioning and retention of said silver coating.

12. A method of producing a housing used with a surveillance system, the housing having a reflective outer surface intended to conceal a camera positioned inside the housing, a portion of its interior surface coated with a light absorbing material adapted to minimize light reflections within said housing and, a portion of its interior surface not coated with said light absorbing material defining a viewing slot for the lens of the camera, said method comprising:

cleaning a member to be coated;

depositing a reflective metalizing layer of silver on interior surfaces of the cleaned member;

depositing a layer of SiO on the silver layer;

applying a plastics film coating; and applying a coating of light absorbing material, one of said coatings being applied to said SiO layer and the other of said coatings being applied to said one coating, said layers and said plastics film coating covering the interior surface of said member.

13. A method according to claim 12 wherein said layers are deposited by positioning the member in a vacuum chamber and by vaporizing material forming the layers inside the member.

14. A method according to claim 13 wherein said method further comprises depositing a binding layer on the interior surface of the member before depositing the silver layer, the binding layer being deposited by vaporizing inside the member material selected from the group comprising Cr, Ni, and NiCr.

* * * * *